(12) United States Patent
Johannesson et al.

(10) Patent No.: US 8,155,651 B2
(45) Date of Patent: Apr. 10, 2012

(54) TRANSMISSION PARAMETER NEGOTIATION AFTER PACKET-SWITCHED HANDOVER

(75) Inventors: Regina Johannesson, Lund (SE); Christian Herrero-Verón, Lund (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1295 days.

(21) Appl. No.: 11/767,799

(22) Filed: Jun. 25, 2007

(65) Prior Publication Data

US 2008/0004022 A1 Jan. 3, 2008

Related U.S. Application Data

(60) Provisional application No. 60/806,014, filed on Jun. 28, 2006, provisional application No. 60/862,086, filed on Oct. 19, 2006.

(51) Int. Cl.
*H04W 36/00* (2009.01)
(52) U.S. Cl. .......................... 455/436; 455/438
(58) Field of Classification Search .................. 455/436, 455/438
See application file for complete search history.

(56) References Cited

U.S. PATENT DOCUMENTS

| 6,590,905 B1 * | 7/2003 | Suumaki et al. | 370/466 |
| 2005/0185619 A1 * | 8/2005 | Niemela et al. | 370/331 |

FOREIGN PATENT DOCUMENTS

| EP | 1320976 B1 | 11/2006 |
| WO | 01/47206 A2 | 6/2001 |
| WO | 02/25888 A2 | 3/2002 |
| WO | 2004/093479 A2 | 10/2004 |

OTHER PUBLICATIONS

3GPP Technical Specification TS 44.065 V6.6.0, Technical Specification Group Core Network and Terminals; Mobile Station (MS)—Serving GPRS Support Node (SGSN); Subnetwork Dependent Convergence Protocol (SNDCP) (Release 6), Jun. 2005.
3GPP Technical Specification TS 44.064 V6.1.0, Technical Specification Group Core Network; Mobile Station—Serving GPRS Support Node (MS-SGSN); Logical Link Control (LLC) layer specification; (Release 6), Sep. 2005.
3GPP Technical Specification TS 43.129 V6.8.0, Packet-switched handover for GERAN A/Gb mode, Stage 2 (Release 6), Jun. 2006.
3GPP TSG CT WG1#144 Change Request C1-062406, Fairfax, US, Oct. 30-Nov. 3, 2006, Oct. 31, 2006.
3GPP Technical Specification TS 44.018 V7.9.0, Mobile Radio Interface Layer 3 Specification, Radio Resource Control (RRC) Specification (Release 7), Jun. 2007.
PCT International Search Report, mailed Oct. 18, 2007, in connection with International Application No. PCT/EP2007/056360.
PCT Written Opinion, mailed Oct. 18, 2007, in connection with International Application No. PCT/EP2007/056360.
International Preliminary Report on Patentability, mailed on Jun. 14, 2008, in connection with International Application No. PCT/EP2007/056360.

* cited by examiner

*Primary Examiner* — Dwayne Bost
*Assistant Examiner* — Joshua Schwartz
(74) *Attorney, Agent, or Firm* — Potomac Patent Group PLLC

(57) ABSTRACT

A user equipment (UE) includes a resettable timer that clocks a period after a successful packet-switched handover in a communication system. If a command message for setting packet-data transmission parameters is not received from the network before the period elapses, the UE starts a transmission-parameter negotiation if the UE wishes to do so. In this way, a UE can negotiate optimal parameters for packet-data transmission.

22 Claims, 3 Drawing Sheets

TRANSMISSION PARAMETER NEGOTIATION AFTER PACKET-SWITCHED HANDOVER

This application claims the benefit of the filing dates of U.S. Provisional Patent Application No. 60/806,014 filed on Jun. 28, 2006, and Application No. 60/862,086 filed on Oct. 19, 2006, the contents of both of which are incorporated here by reference.

BACKGROUND

This invention relates to electronic communication systems and more particularly to packet-data communication systems.

Electronic communication systems include time-division multiple access (TDMA) systems, such as cellular radio telephone systems that comply with the GSM telecommunication standard and its enhancements, such as General Packet Radio Service (GPRS) and Enhanced Data Rates for GSM Evolution (EDGE), and code-division multiple access (CDMA) systems, such as cellular radio telephone systems that comply with the IS-95, cdma2000, and wideband CDMA (WCDMA) telecommunication standards. Electronic communication systems also include "blended" TDMA and CDMA systems, such as cellular radio telephone systems that comply with the universal mobile telecommunications system (UMTS) standard, which specifies a third generation (3G) mobile system being developed by the European Telecommunications Standards Institute (ETSI) within the International Telecommunication Union's (ITU's) IMT-2000 framework. The Third Generation Partnership Project (3GPP) promulgates specifications for UMTS, WCDMA, and GSM communication systems.

FIG. 1 depicts a cellular radio telephone system 10. A base station controller (BSC) 12 and a radio network controller (RNC) 14 control various radio network functions, including for example radio access bearer setup, diversity handover, etc. More generally, the BSC and RNC direct connections to/from mobile stations (MSs) 16 and user equipments (UEs) 18, which may be mobile telephones or other remote terminals, via the appropriate base transceiver station(s) (BTSs) and Node Bs, which communicate with each MS and UE through downlink (i.e., BTS/Node B to MS/UE) and uplink (i.e., MS/UE to BTS/Node B) channels. BSC 12 is shown coupled to BTSs 20, 22, and RNC 14 is shown coupled to Node Bs 24, 26. Each BTS/Node B serves a geographical area that can be divided into one or more cell(s). The BTSs/Node Bs are coupled to their corresponding BSC/RNC by dedicated telephone lines, optical fiber links, microwave links, etc. The BSC 12 and RNC 14 are connected to external networks such as the public switched telephone network (PSTN), the Internet, etc. through one or more nodes in a core network 28 indicated by dashed lines. As depicted in FIG. 1, the core network 28 includes a mobile switching center (MSC) 30, and packet radio service nodes, such as serving GPRS support nodes (SGSNs) 32, 34, and a gateway GPRS support node 36. It will be appreciated of course that various names can be used for the devices depicted in FIG. 1, and for simplicity, the terminals 16, 18 will be commonly called UEs in this application.

Handover, which may also be called hand-off, is generally a process of maintaining on-going connections as UEs move with respect to the BTSs/Node Bs, and possibly vice versa. For example, as a UE moves from one cell to another, the UE's connection is handed over from Node B 26 to Node B 24. Early cellular systems used hard handovers (HHOs), in which a first BTS (covering the cell that the UE was leaving) would stop communicating with the UE just as a second BTS (covering the cell that the UE was entering) started communication. Modern cellular systems typically use diversity, or soft, handovers (SHOs), in which a UE is connected simultaneously to two or more BTSs/Node Bs. A control communication link between the BSCs/RNCs 12, 14 permits diversity communications to/from the UEs 16, 18 via the BTSs/Node Bs 20-26.

Packet-switched (PS) handover (HO) enables a network to control cell changes during packet-data transfers, e.g., GPRS sessions. It will be understood that the "network" here means generally the BSCs/RNCs 12, 14 and entities in the core network 28. One version of the PS HO procedure is specified in 3GPP Technical Specification (TS) 43.129 V6.8.0, Packet-switched handover for GERAN A/Gb mode, Stage 2 (Release 6) (June 2006).

During the PS HO procedure, the network might either reset certain transmission parameters used in the old cell to their default values, or alternatively the network might keep those parameters unchanged. This is indicated by an old eXchange IDdentifier (XID) indicator included in the non-access stratum (NAS) container for a PS HO information element part of a PS HO command message. If an old XID indicator is set, the Logical Link Control (LLC) layer and Layer-3 transmission parameter values that were applicable before receipt of the PS HO command message have to be kept; otherwise, all LLC-layer and Layer-3 transmission parameters have to be reset to default values. The transmission parameters define transmission attributes for Sub-Network Dependent Convergence Protocol (SNDCP) and LLC entities of a GPRS protocol stack. Such entities are typically included in a UE and an SGSN. The transmission parameters are negotiated by the network and the UE during an active session between the UE and an SGSN, and negotiations may be initiated by either side (i.e., the network or the UE) at any time. The purpose of the negotiations is to agree about the best SNDCP- and LLC-related parameters for packet-data transmission used by the UE and the network.

The SNDCP and LLC and their places in the GPRS protocol stack are described in, for example, 3GPP TS 44.065 V6.6.0 (June 2005), Technical Specification Group Core Network and Terminals; Mobile Station (MS)—Serving GPRS Support Node (SGSN); Subnetwork Dependent Convergence Protocol (SNDCP) (Release 6); and 3GPP TS 44.064 V6.1.0 (September 2005), Technical Specification Group Core Network; Mobile Station—Serving GPRS Support Node (MS-SGSN); Logical Link Control (LLC) layer specification; (Release 6); and other technical specifications. In general, the SNDCP and LLC specifications determine the nature of communications between UEs and packet radio service nodes, with the SNDCP functionality mapping network-level characteristics onto the characteristics of the underlying network and the LLC layer providing a reliable logical link. Logical link management functions involve maintenance of communication channels between UEs and the network across the radio interface, co-ordination of link state information between the UEs and network, and supervision of data transfer activity over the logical links between the UEs and the network.

In general, entities at Layer 3 select service access points, logical control channels, and the mode of operation of layer 2 (acknowledged or unacknowledged) as required for each individual message. Layer 3 is described in, for example, 3GPP TS 44.018 V7.9.0 (June 2007), Mobile Radio Interface Layer 3 Specification, Radio Resource Control (RRC) Specification (Release 7), and other technical specifications.

The current PS HO procedure restricts the UE's ability to negotiate the transmission parameters. If the network has indicated to the UE to reset LLC-layer and Layer 3 parameters to default values (i.e., the old XID indicator was not set in the PS HO command message), directly after performing a PS HO, the UE has to wait for an XID command or message sent by the network that either initiates the negotiation or confirms that the default values should be used. Being able to send an XID command to confirm the use of the default values of the transmission parameters is mandatory for a 3GPP-compliant network, but an XID command starting a negotiation of different values is not.

Such operation can cause trouble because the current PS HO procedure does not set a time limit for the UE to wait before the UE is allowed to start its own transmission-parameter negotiation after a PS HO. If the network does not send an XID message dealing with the transmission parameter values directly after the PS HO, the UE cannot start the negotiation itself. One consequence of this can be non-optimal conditions for packet-data transmission.

In addition, some networks never start a transmission-parameter negotiation by proposing values different from the defaults and let the UE take the initiative to start the negotiation. To comply with the current PS HO procedure, such networks would be forced to change their implementations or else face a deadlock: both the UE and the network wait for the other to start the negotiation.

Moreover, in a case of reset to default values after a PS HO, it is the responsibility of an SGSN to send an empty XID command message if it wishes to use the default parameters. Such operation can cause trouble in various situations, such as the loss of the empty XID command message on the radio link (i.e., the UE does not receive the message) and a failure to send the empty XID command message due to an erroneous (non-3GPP-compliant) SGSN implementation.

Furthermore, the default values specified by 3GPP TS 44.065 for the SNDCP and by 3GPP TS 44.064 for the LLC layer are simply the minimum requirements for the SNDCP and LLC layer to perform their functionalities. Better performance typically requires better values, which can be important for packet-based services requiring low latency, e.g., the conversational quality-of-service (QoS) class of services.

SUMMARY

There should be a waiting time limit for the UE after a PS handover before the UE can start its own negotiation. If during this time no message containing SDNCP and/or LLC transmission parameters (i.e., an XID command) is received from network, the UE is allowed to start its own negotiation.

In accordance with aspects of this invention, there is provided a method of operating a receiver after a handover in a packet-switched communication system, where the receiver is configured to receive information from the system based on LLC-layer and Layer-3 entities. The method includes waiting for an XID command that determines or confirms at least one value of at least one transmission parameter for packet data; timing an interval; if the XID command is received before the interval has exceeded a time-out interval, acting on the XID command; and if the XID command is not received before the interval has exceeded the time-out interval, initiating a packet-data transmission-parameter negotiation if desired.

In accordance with other aspects of this invention, there is provided a receiver in a packet-switched communication system configured to receive information under control of LLC-layer and Layer-3 entities. The receiver includes a processor configured to act on a received XID command that determines or confirms at least one value of at least one transmission parameter for packet data after a handover; and a timer for timing a time-out interval. If the XID command is received before the timer has timed out, the processor acts on the XID command; and if the XID command is not received before the timer has timed out, the processor initiates a packet-data transmission-parameter negotiation if desired.

In accordance with further aspects of this invention, there is provided a computer-readable medium encoded with a computer program for operating a receiver after a handover in a packet-switched communication system, where the receiver is configured to receive information under control of LLC-layer and Layer-3 entities. The computer program when executed causes the computer to perform at least the steps of waiting for an XID command that either determines or confirms at least one value of at least one transmission parameter for packet data; timing an interval; if the XID command is received before the interval has exceeded a time-out interval, acting on the XID command; and if the XID command is not received before the interval has exceeded the time-out interval, initiating a packet-data transmission-parameter negotiation if desired.

BRIEF DESCRIPTION OF THE DRAWINGS

The various features, objects, and advantages of this invention will be apparent after reading this description together with the drawings, in which.

DETAILED DESCRIPTION

Figure 1:
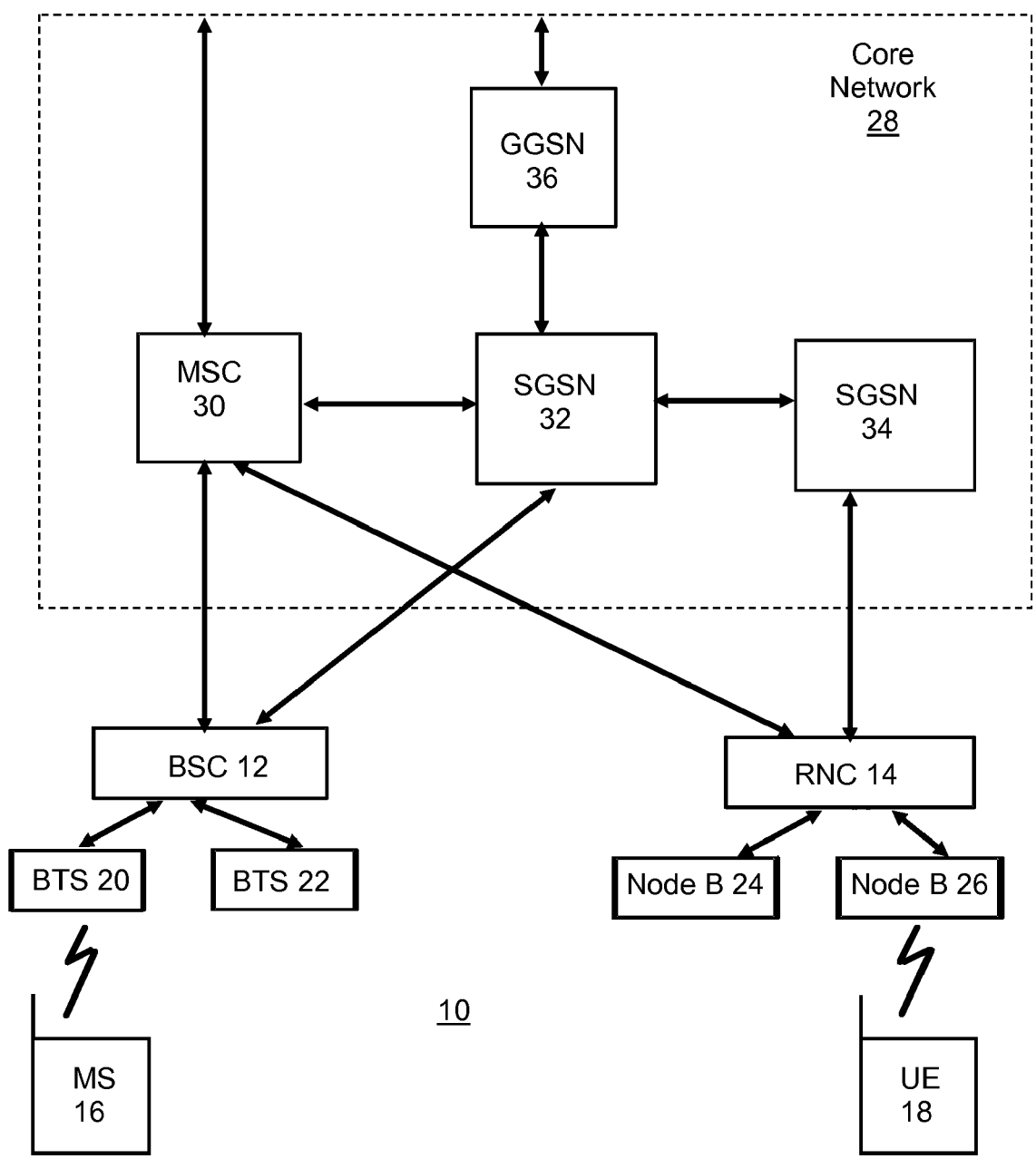
FIG. 1 depicts a communication system.

In accordance with aspects of this invention, the UE includes a resettable timer that times an interval, e.g., an interval after a successful PS HO. If an XID command message to negotiate transmission parameters is not received from the network before the time-out interval elapses, the UE starts a transmission-parameter negotiation if the UE wishes to do so. In this way, a UE can negotiate optimal parameters for packet-data transmission after a PS HO in a situation in which, from the UE's point of view, the network has not started the negotiation, e.g., because it is not mandatory for the network to do so or because network performance might be better if the UE starts the negotiation rather than the network.

Such a waiting period also solves problems caused by failure to receive messages from the network, e.g., an empty XID command message to confirm that an SGSN wishes to use the default parameters. With a time-out interval, a UE will not wait indefinitely for the empty XID command and will be able to have optimal connections for packet-based services with low latency requirements, e.g., the conversational QoS class of services.

Before describing the details of the waiting period and its benefits for XID parameter-negotiation procedures, it will be recalled that in 3GPP-compliant communication systems, a logical link entity (LLE) is a state machine at the LLC layer that controls a logical link connection, which is a logical connection between two LLE peers. In general, the LLC layer is a protocol layer between a UE and an SGSN that includes one or more logical link management entities, one or more LLEs, and a multiplex procedure. An LLC-layer connection is identified by a data link connection identifier (DLCI), which includes a service access point identifier (SAPI) and the UE's temporary logical link identifier (TLLI). An "active" LLE is an LLE that has a SAPI assigned to a Layer-3 entity.

Each LLE has an associated logical link management entity (LLME) that has the responsibility for initializing the LLC-layer parameters necessary for correct peer-to-peer information transport. The transmission parameters are set either to default values or to values supplied through a parameter-negotiation procedure. The negotiable transmission parameters can include an LLC version number, ciphering input offset values for different kinds of frames, re-transmission time-out periods, maximum numbers of re-transmissions, maximum information field lengths for different kinds of frames, uplink and downlink frame-buffer and window sizes, and one or more Layer-3 parameters. The negotiable parameters also particularly include a Reset parameter that is negotiated via an exchange of XID frames. LLC-layer and Layer-3 parameters may also be negotiated via an exchange of XID frames. The negotiated XID parameters apply to the LLE identified by the DLCI of the XID frames used, except Layer-3 parameters apply to Layer 3 above the LLE.

In the transmission-parameter negotiation procedure, an originating LLE issues an XID command containing the parameters that the LLE wants to negotiate, and sets one or more timers, such as a timer T200 that measures a re-transmission time-out period. A receiving peer LLE replies to the XID command with an XID response that includes a list of parameter values that the peer LLE can support. The originating LLE resets the timer T200 when the XID response is received.

Figure 2A:
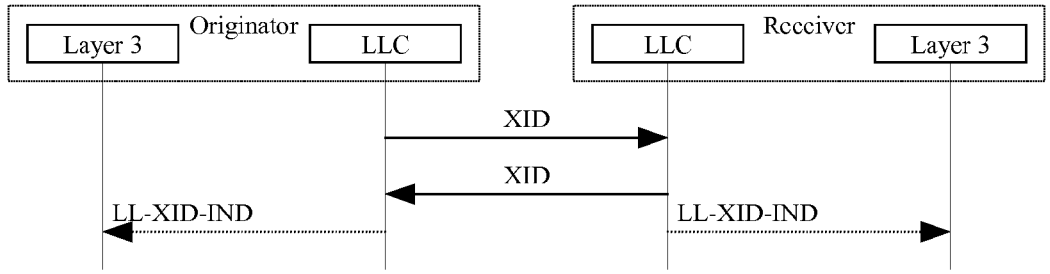
FIGS. 2A, 2B depict XID negotiation procedures.

The exchange of XID messages by LLC-layer entities in a transmission-parameter-negotiation procedure initiated by an LLC-layer entity is illustrated by FIG. 2A, in which the Originator is an SGSN and the Receiver is a UE for a network-initiated parameter negotiation, and vice versa for a UE-initiated parameter negotiation. As depicted in FIG. 2A, the parameter-negotiation procedure may also involve the sending of messages from LLC-layer entities to Layer-3 entities, e.g., LL-XID-IND messages.

Figure 2B:
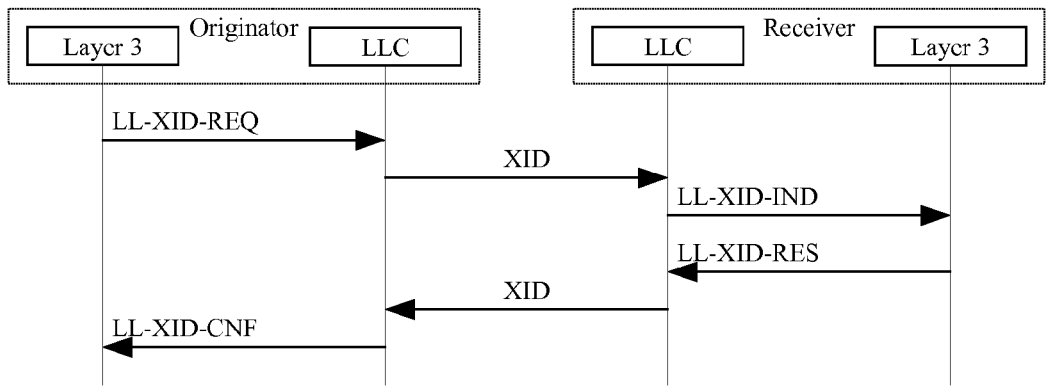

The exchange of XID messages by LLC-layer entities in a transmission-parameter-negotiation procedure initiated by a Layer-3 entity is illustrated by FIG. 2B, in which the Originator may again be an SGSN and the Receiver may again be a UE for a network-initiated parameter negotiation, and vice versa for a UE-initiated parameter negotiation. As depicted in FIG. 2B, the parameter-negotiation procedure begins with the sending of an LL-XID-REQ request message from a Layer-3 entity to an LLC-layer entity at the Originator, which responds by sending an XID message to the LLC-layer entity at the Receiver. That entity sends an LL-XID-IND message to the Layer-3 entity at the Receiver, which responds with an LL-XID-RES response message, prompting the LLC-layer entity at the Receiver to send an XID message to the LLC-layer entity at the Originator. That entity responds by sending an LL-XID-CNF confirmation message to its Layer 3 entity.

Figure 3:
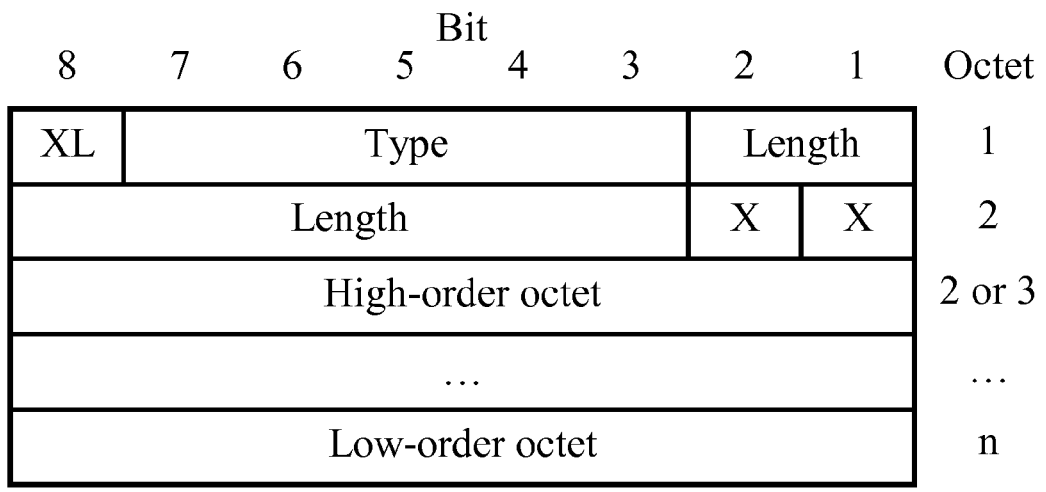
FIG. 3 depicts a message format.

FIG. 3 shows a useful format of an XID message and its parameter field. XID messages may have bits, such as poll/final bits, always set to a predetermined value, e.g., 1. Other bits carry information about the message itself and about the transmission parameter values. As depicted in FIG. 3, bits in the first and possibly the second octet of an XID message indicate the type and length (in octets) of the message. The other octets indicate transmission parameter values, such as the Reset parameter.

The Reset parameter in an XID message can be used in an SGSN originating reset of the transmission parameters and in a UE receiving reset for a variety of purposes, and is treated before any additional XID parameters present in the same XID message. For example, the Reset parameter may cause all requests pending from Layer 3 to the LLEs to be discarded with no further action. Any ongoing asynchronous balanced mode (ABM) establishment, ABM release, and XID negotiation procedures, except the XID negotiation procedure used to negotiate the Reset parameter, may be aborted. If the old XID indicator is set, the LLC-layer and Layer-3 parameter values that were applicable before the receipt of the Reset are kept, and otherwise all LLC-layer and Layer-3 parameters are reset to default values. 3GPP TS 44.064, for example, specifies a set of default values. Any LLEs in the ABM state may be changed to an asynchronous disconnected mode (ADM) state. Various state variables and the OCs for unacknowledged information transfer may be initialized.

If during PS HO the UE is requested to reset LLC-layer and Layer-3 parameters, the UE performs the actions described above and sends an XID response on an active SAPI after the PS HO procedure has been successfully completed. The UE's XID response can generally have the form depicted in FIG. 3.

The inventors have recognized that if a reset of LLC-layer parameters and Layer-3 parameters has been requested without an old XID indicator, then each active LLE can set a timer T100 after sending the XID response. Until the timer T100 expires, i.e., until a waiting period measured by the timer T100 elapses, an active LLE does not initiate an XID negotiation procedure. After the timer T100 expires, the LLE is allowed to initiate the transmission-parameter negotiation procedure. The timer T100 can be set to any suitable default value, and will usually be of the order of seconds, e.g., three seconds. Moreover, it can be advantageous for the value of T100 to be one of the negotiated transmission parameters.

Figure 4:
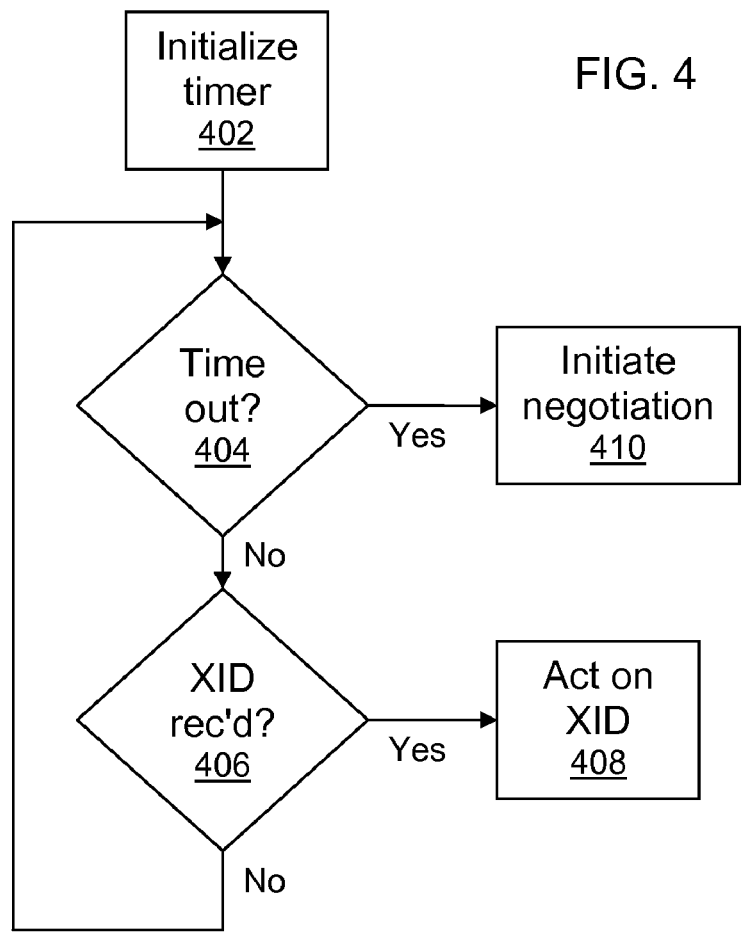
FIG. 4 is a flow chart of a method of operating a receiver after a handover in a packet-switched communication system.

Accordingly, a method of operating a UE after a PS HO is depicted in FIG. 4. The UE initializes a timer T100 (step 402) and waits for an XID command from the network. That XID command either can determine at least one transmission parameter value, e.g., by including one or more parameter values, or can confirm at least one transmission parameter value, e.g., by indicating that one or more default parameter values should be used. If the timer T100 has not timed out (No in step 404) and an XID command is received (Yes in step 406), the UE acts on the command (step 408).

For example, if the received XID command is not an empty XID command, i.e., it determines one or more transmission parameter values, then the UE acts on the XID command by sending an XID response and proceeding with a negotiation of LLC-layer and Layer-3 parameters based on the not-empty XID command. It will be understood that the UE typically checks a received command for correctness, for example by examining a cyclic redundancy check (CRC) field or similar integrity indicator in the XID command, before sending a response. Section 8.5.3 of 3GPP TS 44.064, for example, describes checking correctness of XID commands.

If the received XID command is an "empty" XID command, then this is an indication that the SGSN wishes to use or continue to use default values for the transmission parameters, and the UE can act on the XID command by using one or more default values for one or more LLC-layer and Layer 3 parameters. An empty XID command is one that does not contain any parameter to negotiate, but through its indication of use of default values, an empty XID command confirms at least one value of a transmission parameter. The UE can return an XID response after a correct empty XID command, it can be optional for the UE simply to discard the command and not return a response.

If the timer has timed out before the UE has received an XID command from the network (Yes in step 404), the UE initiates a transmission-parameter negotiation (step 410) if the UE desires to do so.

It will be appreciated that the transmission-parameter negotiation procedure is a one-step procedure. The originating side starts the process by sending an XID command that proposes values for a set of one or more parameters that the sending entity wants to negotiate. In response, the receiving side sends an XID response, either confirming the proposed parameter values (e.g., by either omitting or including the proposed values in the XID response), or offering different ones in their places. Parameters that are included in neither the XID command nor the XID response can retain their current values, and in the absence of a prior exchange of XID messages, default values of the parameters apply.

The responding side may respond with parameters that were not included in the XID command, in which case a parameter that was not included in the XID command is treated as if the current value of the parameter were included in the XID command. The responding side includes such a parameter in every XID response until the parameter has been explicitly negotiated, either by responding to an XID command that included the parameter, or by explicitly including the parameter the next time an XID command is transmitted.

Figure 5:
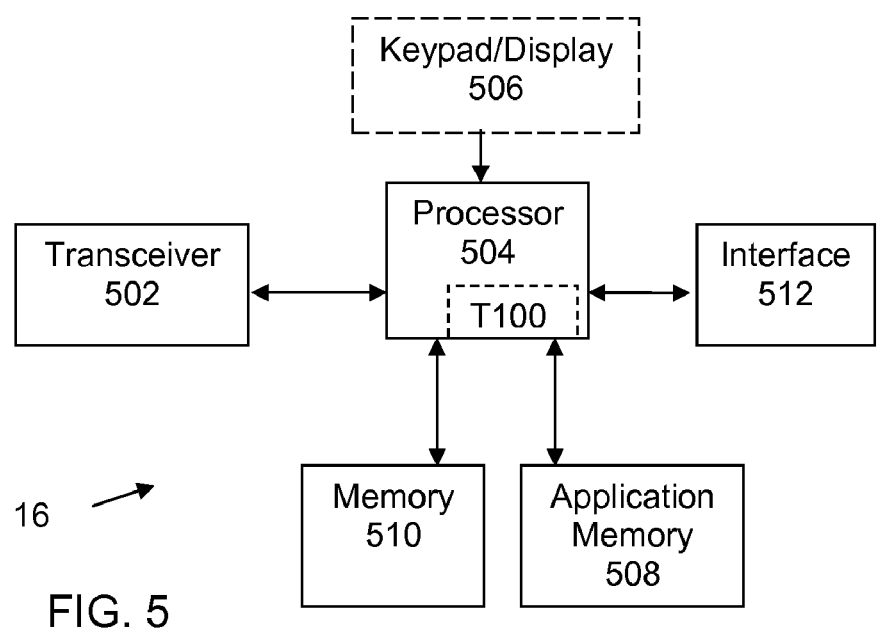
FIG. 5 is a block diagram of a receiver for a communication system.

FIG. 5 is a block diagram of a typical UE 16, including a transceiver 502 that is suitable for exchanging radio signals with BTSs/Node Bs in a network (not shown in FIG. 5). Information carried by those signals is handled by a processor 504, which may include one or more sub-processors, and which executes one or more software modules and applications, such as the timer Ti 00, to carry out the transmission parameter negotiation procedure described in this application. It will be appreciated that the timer Ti 00 may be implemented in the UE in many ways, including as a hardware device. User input to the terminal may be provided through an optional keypad or other device, and information may be presented to the user on an optional display 506. The keypad/display 506 is considered optional, and is thus indicated by dashed lines, because some devices, such as embedded mobile devices and machine-to-machine communication modules, may not need a keypad or a display. Software applications may be stored in a suitable application memory 508, and the device may also download and/or cache desired information in a suitable memory 510. The UE 16 also may include an interface 512 that can be used to connect other components, such as a computer, keyboard, etc., to the UE 16.

Services like the conversational QoS class of services have requirements that can benefit from transmission parameters optimized through the XID negotiation procedure. For example, the default value of the N-201-U parameter, which is the maximum length of the information field in uplink frames, is usually not more than about 500 for different SAPIs. A better value of the N-201-U parameter for some services can be about 1500.

As noted above, an SGSN that receives a handed-over UE is required in a 3GPP-compliant communication system to send an empty XID command if the SGSN wishes to use default values for the transmission parameters. Such an empty XID command can be, for example, lost or corrupted on the way from the network to the UE or otherwise can be not acted on by the UE. In addition, an empty XID command may not even be sent due to an improper SGSN implementation. Moreover, the UE knows the data-transfer parameters required by applications and other software running in the UE, e.g., applications that use the conversational QoS class of services, and thus the UE knows when the default parameters are inappropriate.

To compensate for such situations and avoid using non-optimal connections, the UE is advantageously allowed to initiate the XID negotiation procedure by the timer T100, which advantageously sets a period for a UE to wait for an empty XID command message from an SGSN before the UE initiates the XID negotiation procedure.

It will be appreciated that procedures described above are carried out repetitively as necessary, for example, to respond to the time-varying nature of communication channels between transmitters and receivers. To facilitate understanding, many aspects of this invention are described in terms of sequences of actions that can be performed by, for example, elements of a programmable computer system. It will be recognized that various actions could be performed by specialized circuits (e.g., discrete logic gates interconnected to perform a specialized function or application-specific integrated circuits), by program instructions executed by one or more processors, or by a combination of both.

Moreover, this invention can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions. As used here, a "computer-readable medium" can be any means that can contain, store, or transport the program for use by or in connection with the instruction-execution system, apparatus, or device. The computer-readable medium can be, for example but not limited to, an electronic, magnetic, optical, electromagnetic, infrared, or semiconductor system, apparatus, or device. More specific examples (a non-exhaustive list) of the computer-readable medium include an electrical connection having one or more wires, a portable computer diskette, a random-access memory (RAM), a read-only memory (ROM), an erasable programmable read-only memory (EPROM or Flash memory), and an optical fiber.

Thus, the invention may be embodied in many different forms, not all of which are described above, and all such forms are contemplated to be within the scope of the invention. For each of the various aspects of the invention, any such form may be referred to as "logic configured to" perform a described action, or alternatively as "logic that" performs a described action.

It is emphasized that the terms "comprises" and "comprising", when used in this application, specify the presence of stated features, integers, steps, or components and do not preclude the presence or addition of one or more other features, integers, steps, components, or groups thereof.

The particular embodiments described above are merely illustrative and should not be considered restrictive in any way. The scope of the invention is determined by the following claims, and all variations and equivalents that fall within the range of the claims are intended to be embraced therein.

What is claimed is:

1. A method of operating a receiver after a handover in a packet-switched communication system, wherein the receiver is configured to receive information under control of logical link control (LLC) layer and Layer-3 entities, comprising the steps of:

timing an interval after the handover to wait for an exchange identification (XID) command that either determines or confirms at least one value of at least one transmission parameter for packet data;

if the XID command is received before the interval has exceeded a time-out interval, acting on the XID command; and if the XID command is not received before the interval has exceeded the time-out interval, initiating a packet-data transmission-parameter negotiation if desired.

2. The method of claim 1, wherein the XID command is an empty XID command that confirms use of at least one default value of at least one transmission parameter.

3. The method of claim 2, wherein if an empty XID command is received before the interval has exceeded the time-out interval, the step of acting on the XID command includes sending an XID response.

4. The method of claim 1, wherein the XID command includes at least one value of at least one transmission parameter, and the step of acting on the XID command includes negotiating at least one value of at least one transmission parameter.

5. The method of claim 4, wherein the at least one transmission parameter includes the time-out interval.

6. The method of claim 1, further comprising the step of receiving a reset command that determines that a value of at least one transmission parameter is to be reset to a default value, and wherein the step of waiting for an XID command comprises waiting for either a confirmation message for the reset command or an XID command initiating negotiation of at least one transmission parameter value.

7. The method of claim 1, wherein the time-out interval is of the order of seconds.

8. The method of claim 1, wherein timing the interval is initiated by the handover.

9. A receiver in a packet-switched communication system configured to receive information under control of logical link control (LLC) layer and Layer-3 entities, comprising:

a processor configured to act on a received exchange identification (XID) command that either determines or confirms at least one value of at least one transmission parameter for packet data after a handover; and a timer for timing a time-out interval after the hand-over; wherein if the XID command is received before the timer has timed out, the processor acts on the XID command; and if the XID command is not received before the timer has timed out, the processor initiates a packet-data transmission-parameter negotiation if desired.

10. The receiver of claim 9, wherein the XID command is an empty XID command that confirms use of at least one default value of at least one transmission parameter.

11. The receiver of claim 10, wherein if the empty XID command is received before the interval has exceeded the time-out interval, the processor acts on the empty XID command by sending an XID response.

12. The receiver of claim 9, wherein the XID command includes at least one value of at least one transmission parameter, and the processor acts on the XID command by negotiating at least one value of at least one transmission parameter.

13. The receiver of claim 12, wherein the at least one transmission parameter includes the time-out interval.

14. The receiver of claim 9, wherein the processor is configured to act on a received reset command that determines that a value of at least one transmission parameter is to be reset to a default value, and the received XID command comprises either a confirmation message for the reset command or an XID command initiating negotiation of at least one transmission parameter value.

15. The receiver of claim 9, wherein the time-out interval is of the order of seconds.

16. A non-transitory computer-readable medium encoded with a computer program for operating a receiver after a handover in a packet-switched communication system, wherein the receiver is configured to receive information under control of logical link control (LLC) layer and Layer-3 entities, and the computer program when executed causes the computer to perform at least the steps of:

timing an interval after the handover to wait for an exchange identification (XID) command that either determines or confirms at least one value of at least one transmission parameter for packet data;

if the XID command is received before the interval has exceeded a time-out interval, acting on the XID command; and if the XID command is not received before the interval has exceeded the time-out interval, initiating a packet-data transmission-parameter negotiation if desired.

17. The medium of claim 16, wherein the XID command is an empty XID command that confirms use of at least one default value of at least one transmission parameter.

18. The medium of claim 17, wherein if the empty XID command is received before the interval has exceeded the time-out interval, the empty XID command is acted on by sending an XID response.

19. The medium of claim 16, wherein the XID command includes at least one value of at least one transmission parameter, and the step of acting on the XID command includes negotiating at least one value of at least one transmission parameter.

20. The medium of claim 19, wherein the at least one transmission parameter includes the time-out interval.

21. The medium of claim 16, wherein the computer program when executed causes the computer to perform at least the further step of receiving a reset command that determines that a value of at least one transmission parameter is to be reset to a default value, and the step of waiting for an XID command comprises waiting for either a confirmation message for the reset command or an XID command initiating negotiation of at least one transmission parameter value.

22. The medium of claim 16, wherein the time-out interval is of the order of seconds.

* * * * *

UNITED STATES PATENT AND TRADEMARK OFFICE
CERTIFICATE OF CORRECTION

| | | |
|---|---|---|
| PATENT NO. | : 8,155,651 B2 | Page 1 of 1 |
| APPLICATION NO. | : 11/767799 | |
| DATED | : April 10, 2012 | |
| INVENTOR(S) | : Johannesson et al. | |

It is certified that error appears in the above-identified patent and that said Letters Patent is hereby corrected as shown below:

In Column 3, Line 48, delete "SDNCP" and insert -- SNDCP --, therefor.

In Column 7, Line 35, delete "Ti 00," and insert -- T100, --, therefor.

In Column 7, Line 37, delete "Ti 00," and insert -- T100, --, therefor.

In Column 8, Lines 30-31, delete "medium"can" and insert -- medium" can --, therefor.

Signed and Sealed this
Thirtieth Day of October, 2012

David J. Kappos
*Director of the United States Patent and Trademark Office*